United States Patent [19]

Karl

[11] 4,119,731

[45] Oct. 10, 1978

[54] PREPARING YEAST RAISED BAKERY PRODUCTS

[76] Inventor: Kurzius A. Karl, 9615 Cochiti, SE., Albuquerque, N. Mex. 87123

[21] Appl. No.: 749,308

[22] Filed: Dec. 10, 1976

[51] Int. Cl.² ............................................. A21D 2/36
[52] U.S. Cl. ..................................... 426/20; 426/21; 426/28; 426/507
[58] Field of Search ................... 426/19, 20, 21, 23, 426/549, 629, 507; 260/123.5

[56] References Cited

U.S. PATENT DOCUMENTS

| | | | |
|---|---|---|---|
| 1,581,112 | 4/1926 | Grelck | 426/19 |
| 2,060,264 | 11/1936 | Swift | 426/20 |

OTHER PUBLICATIONS

Braue, *Uncle John's Original Bread Book*, (1965), Pyramid Books, New York, pp. 84, 128, 135, 138.
Hoffpauir, *The Gin and Oil Mill Press*, "New Food for the Protein-Hungry World", Aug. 19, 1972.

*Primary Examiner*—Raymond N. Jones
*Assistant Examiner*—Esther M. Kepplinger
*Attorney, Agent, or Firm*—Richard A. Bachand

[57] ABSTRACT

A process for making yeast raised bakery products which includes the steps of preparing a dough including glandless cotton seed and yeast, mixing the dough, forming the dough into a desired bakery product shape, and baking the formed dough.

13 Claims, No Drawings

PREPARING YEAST RAISED BAKERY PRODUCTS

BACKGROUND OF THE INVENTION

1. Field of the Invention

This invention relates to a process for making bread, biscuits, or other yeast raised bakery products, and more particularly to a process for making bakery products which contain glandless cotton seed, and to a product made by such process.

2. Description of the Prior Art

Ready-to-serve and other modern forms of time-honored yeast breads are widely available at bakery shops, grocers, and markets. Add to these the long-tested recipes for favorite breads of the American homes and those of other countries, and a delectable variety to serve with todays meals is available. In general, however, it is well known in the art that yeast raised bread calls for more preparation time than baking-powder breads. Yeast raised bakery products add good flavor and a special quality to any meal. Served hot and attractively presented in a napkin-lined basket, silver tray, painted box or other server, hot breads indicate that the host or hostess gave special attention to planning and preparing the meal. Delicious hot yeast breads add a fillup to brunch, lunch, dinner, or supper. They can also be the high point of pleasure with tea served to a group. They always add to a coffee klatch or other occasion.

An important distinction in preparing bakery products is whether the product is yeast raised — such as the bakery products of this invention — or is classified as quick. Quick bakery products include cookies, waffles, pancakes, muffins and scones. Quick bakery products contain baking powder or baking soda as a raising agent. They do not require a period of rising prior to baking because the leavening takes place in the oven during baking.

On the other hand, yeast bakery products rise from the chemical actions that occur when the yeast mixes with some or all of the ingredients forming the dough.

As will later be more fully explained, the process for making yeast raised bakery products disclosed herein provides a very nutritious food having a high protein and vitamin content. Applicant knows of no prior art patents or other publications which relate to, or even suggest, a method of making yeast raised bakery products containing cotton seed.

Applicant is aware, however, that others have made cookies using glandless cotton seeds as an ingredient and perhaps other quick bakery products, but all efforts by these experts in the art to make yeast raised bread, biscuits or other yeast raised products containing cotton seeds have failed. This failure is believed to be the result of not discovering a critical step in the process, as will later be more fully explained.

This invention then relates to the use of glandless cotton seeds in yeast raised bakery products.

SUMMARY OF THE INVENTION

In the light of all of the above it is an object of the invention to present a process for making bakery products.

It is another object of the invention to present a process for making yeast raised bakery products.

It is yet another object of the invention to present a process for making yeast raised bakery products which are highly nutritious and have a high protein and vitamin content.

It is still another object of the invention to present a process for making yeast raised bakery products which contain cotton seeds as one ingredient.

It is yet still another object of the invention to present a process for making yeast raised bakery products including the steps of preparing a dough containing cotton seed, mixing the dough, forming the dough into a desired shape, and baking the dough.

It is still another object of the invention to present a product made by the process of the invention.

DESCRIPTION OF THE PREFERRED EMBODIMENT

As is well known, the common and usual cotton seed is poisonous and completely unfit for human consumption. However, quite recently scientists at the University of Texas have developed a species of cotton plant which bears a glandless cotton seed which is not poisonous, is an excellent food, and is very high in protein, vitamins, and minerals. Nutritionists, expert in the problems of nutrition, have equated the food value of the glandless cotton seed to that of the peanut. Additionally, the seed has a natural oil contained therein which, together with its abundance of fiber, makes it beneficial to the human digestive tract and its digestive process. Another and unexpected benefit is that the plant bearing the edible cotton seed will grow in areas where very little water is available. This characteristic is expected to assist in the world nutrition problem in the years to come.

In one embodiment of the invention, a dough is formed by mixing together flour, water, a leavening ingredient, salt and cotton seeds, then baking the dough to produce the desired product. Additional ingredients may be included for particular tastes, for instance, whole and/or coarse wheat grains, wheat and/or rye flours, malt, sour cultures, and so forth. Other variations in taste producing ingredients will become apparent to those skilled in the art.

More specifically, in the preferred aspect of the invention a process is presented for making a yeast raised bakery product in which the following listed ingredients are mixed, by weight, to form a dough:

Wheat flour: 44.0%
Water: 37.0%
Glandless cotton seed: 6.0%
Rye flour: 5.0%
Whole wheat: 3.0%
Coarse wheat: 3.0%
Yeast: 0.9%
Sour culture: 0.5%
Salt: 0.4%
Malt: 0.2%

The sour culture listed above is made in accordance with standard practices from a mixture of yeast, flour and water, allowed to ferment for between 4 and 5 days for use in the dough.

The glandless cotton seed is available commercially and is usually baked or roasted by the supplier to preserve it. It has been discovered that further baking makes the seed hard and brittle and not pleasant for chewing.

In light of the difficulty of baking commercially available cotton seeds, a critical step has been discovered to be required to be performed prior to preparing the dough in the proportions listed above. It has been discovered that the cotton seeds must be soaked prior to their use in the recipe. The soaking can be done in water for about 15 minutes before the ingredients are mixed to form the dough. It has further been discovered that if the cotton seeds are soaked for about 15 minutes in the sour culture together with the water, that a particularly pleasing taste is imparted to the ultimate product. It is believed that this step causes the cotton seed hull to open and a fermentation to take place making the cotton seed soft and easily chewed, as well as imparting the unique and pleasing taste to the final baked product, as mentioned.

After the cotton seed soaking is completed, the ingredients are placed together in a commercial type bakery mixer and are mixed, first at a relatively slow speed, and then at a relatively high speed. The temperature of the dough after the mixing may be used as a measure of the mixing time required to achieve the desired completeness of mixing. In high altitude areas it should be about 78° F. and in low altitude areas it should be about 85° F. After mixing, the dough is formed into a desired shape. If it is a commercial operation the formed dough is weighed to conform to the stated weight on the label (with allowances for losses during baking) and then the dough is baked for about 34 minutes at 400° F.

In a typical commercial bread-baking process the following weights of ingredients can be used to produce the dough for nine loaves:

|  | LB | OZ |
|---|---|---|
| Wheat flour | 12 |  |
| Water | 10 |  |
| Glandless cotton seed | 1 | 12 |
| Rye flour | 1 | 8 |
| Whole wheat |  | 12¾ |
| Coarse wheat |  | 12 |
| Yeast |  | 4 |
| Sour culture |  | 2½ |
| Salt |  | 2 |
| Malt |  | 1 |

It will be understood that percentages and weights are approximate and may be modified.

In the preferred method the dough is mixed for about 2 minutes at a slow mixing speed and thereafter it is mixed for about 10 minutes at a higher speed. The speed of mixing has been found not to be critical but the temperature at the end of the mixing phases may be monitored to indicate its thoroughness. The temperature of the dough should be about 78° F. in high altitude areas and about 85° F. in low altitude areas when the mixing is completed. The longer the mixing time the higher the temperature within limits; so that if the dough does not attain the above temperatures in the suggested time, then further mixing time is allowed. The mixing process opens the gluten in the rye and wheat flour. Gluten is a grey, sticky, nutrious substance which is found in the flour of grains which gives the dough its tough elastic quality.

At this point it is optional as to whether a proving time is allowed. Proving time means the time to allow the dough to rise as a result of fermentation. If it is desired to make biscuits no time is allowed for proving. But, if the product is to be bread, approximately 15 minutes is allowed in which time, using the ingredients named above, the dough will rise to about double its initial volume.

The dough is baked for about 34 minutes at about 400° F., yielding a firm nutritious product which is rapidly gaining popularity as a nutritious health food.

Although the invention has been described and illustrated with a certain degree of particularly the disclosure is made by way of example only and the changes in the combination and amounts of the ingredients and in baking times and temperatures may be made and resorted to without departing from the scope and spirit of the invention as hereinafter claimed.

I claim:

1. A process for making yeast raised bakery product containing glandless cotton seeds consisting essentially of the steps of soaking said glandless cotton seed and sour culture together in water for about 15 minutes to open the seed hull,
    adding together wheat flour, water, said soaked glandless cotton seed and sour culture, rye flour, whole wheat, coarse wheat, yeast, salt and malt to form a dough,
    mixing said dough,
    forming a portion of said dough into a desired shape, proofing said dough,
    and baking the formed dough for about 34 minutes at about 400° F.

2. The process of claim 1 wherein said proofing step is for a time of about 15 minutes between the dough forming step and the baking step.

3. The process of claim 2 wherein the temperature of the dough at the end of the mixing step is about 78° F. in high altitude areas and about 85° F. in low altitude areas.

4. The process of claim 3 wherein the dough contains approximately, by weight, 44.0% wheat flour, 37.0% water, 6.0% glandless cotton seed, 5.0% rye flour, 3.0% whole wheat, 3.0% coarse wheat, 0.9% yeast, 0.5% sour culture, 0.4% salt and 0.2% malt.

5. A process for making yeast raised bakery products containing glandless cotton seeds, consisting essentially of the steps of:
    soaking said cotton seeds to open the seed hull, said soaking comprising the step of allowing said cotton seeds to remain in a mixture of water and a sour culture for about 15 minutes,
    mixing together flour, water, yeast, salt, and the soaked cotton seeds to form a dough,
    proofing the mixture,
    and baking the dough.

6. The process of claim 5 further comprising adding said sour culture as a part of said mixing step.

7. The process of claim 5 further comprising adding as a part of said mixing step at least one grain selected from the group consisting of whole wheat and coarse wheat.

8. The process of claim 5 wherein said mixing step further comprises adding both wheat flour and rye flour.

9. The process of claim 5 wherein said baking step further comprises allowing said dough to bake at a temperature of about 400° F. for a time of about 34 minutes.

10. The process of claim 5 wherein said mixing step further comprises continuing to mix said flour, water, yeast, salt, and soaked cotton seeds ingredients until said ingredients reach a temperatre of between 78° F. and 85° F.

11. The process of claim 5 wherein said proofing time between said mixing step and said baking step is of between zero and about 15 minutes.

12. The product made in accordance with the process of claim 5.

13. The product made in accordance with the process of claim 1.

* * * * *